C. T. KAMMEYER.
TYPE GAGE.
APPLICATION FILED OCT. 3, 1916.

1,354,977. Patented Oct. 5, 1920.

Witness:
E. M. Schweiger

Charles T. Kammeyer, Inventor.
By Emil Neubach
Attorney.

UNITED STATES PATENT OFFICE.

CHARLES T. KAMMEYER, OF NIAGARA FALLS, NEW YORK.

TYPE-GAGE.

1,354,977.

Specification of Letters Patent. Patented Oct. 5, 1920.

Application filed October 3, 1916. Serial No. 123,513.

*To all whom it may concern:*

Be it known that I, CHARLES T. KAMMEYER, a subject of the King of Great Britain, residing at Niagara Falls, in the county of Niagara and State of New York, have invented certain new and useful Improvements in Type-Gages, of which the following is a specification.

My invention relates to type gages, and more particularly to a computing gage adapted for use by authors; advertising writers; preparers of copies of catalogues and magazines; hand compositors; linotype and monotype operators.

One of the objects of my invention is the provision of a gage whereby a compositor or like artisan, knowing the size of the space or spaces in which manuscripts are to be printed, may determine the size of type to be used for printing the manuscripts within such space or spaces whether such space or spaces are of square, oval, circular, rectangular, or irregular formation.

Another object of my invention is the provision of a gage which will aid in rapidly converting manuscript into type form when the matter contained in such manuscript is to be distributed throughout numerous small spaces, whether of regular or irregular formation, giving the desired result as to the size of type and number of words to be set into each of said spaces.

Another object is the provision of a gage for computing the number of words to a square inch or to a line before setting the type.

Another object is to provide means for enabling any writer, even though not familiar with type faces or the sizes of type, to determine how much matter to write for an allotted space.

Further objects are the provision of a gage which will enable one to determine how to space or arrange type matter to fit around irregular shaped cuts, such as used in catalogues and works of art, so as to allow the proper amount of margin or white space around the cut; to provide a gage which will be of benefit in various other ways for producing attractive effects in printing, and by the use of which considerable time and labor is saved in setting up type within any predetermined space, whether of regular or irregular formation.

To this end my invention consists in a gage having solid printed matter thereon printed with a certain size or sizes of type, the printed matter covering a certain space measured by square inches or otherwise, the size of the space being known to the user of the gage so that he may compute the size of the space to which the type form is to be set for printing therefrom.

It also consists in a gage having printed thereon in a space or spaces of known square or other areal measurement, matter formed of average lengths of words, such matter being printed with a certain size or sizes of type from which the user may ascertain the number of words of ordinary length within such space or each of such spaces and ascertain the size of the space, whether regular or irregular, which is to be supplied with printed matter, and also compute the size of type that may be used for best effect and results within such space.

It further consists in a gage divided into a number of spaces, each of certain square measurement;—for example, a certain number of square inches—and having across said spaces printed matter printed with a certain size of type, thus giving the number of words printed with said type on each or all of said spaces, whereby the user may determine whether a certain manuscript intended to be printed within a known space can be printed with the type on said gage, or whether smaller or larger type can be used.

It further consists in a computing gage having its face divided into certain spaces of known square or other areal measurement, in each of which matter is printed with a size of type different from the other space or spaces, and having such printed spaces sub-divided into smaller spaces of known square or other areal measurement,—for example, square inches—to enable the user to measure a certain space available for printing and compute the number of words capable of being printed within such available space in any of the sizes of type printed in the divided spaces of such gage, or to enable the user to ascertain the size of type to be used in printing matter, or in readjusting printed matter printed in a space of different formation than the said available space.

It further consists in a gage of transparent material divided into spaces and adapted to be placed onto the space in which printing is to be done to determine the size of such space, said gage having a table thereon informing the user of the number of words of ordinary length which may be printed in each of said spaces with different size type, and the number of words in a line 24 ems wide printed with different size type, thus enabling the user, knowing the number of words to be printed, to ascertain rapidly and accurately the size of type to be used for printing the complete matter within the space, and also to determine the number of words or the number of lines in a column, after having ascertained the length of the column.

It further consists in a gage having a scale by means of which the number of lines in a column printed in any of certain size type may be ascertained and by resorting to the table above referred to, also ascertain the number of words in such column, and it further consists in the novel features and arrangement of parts to be hereinafter described and particularly pointed out in the subjoined claims.

In the drawings—

Figure 1:
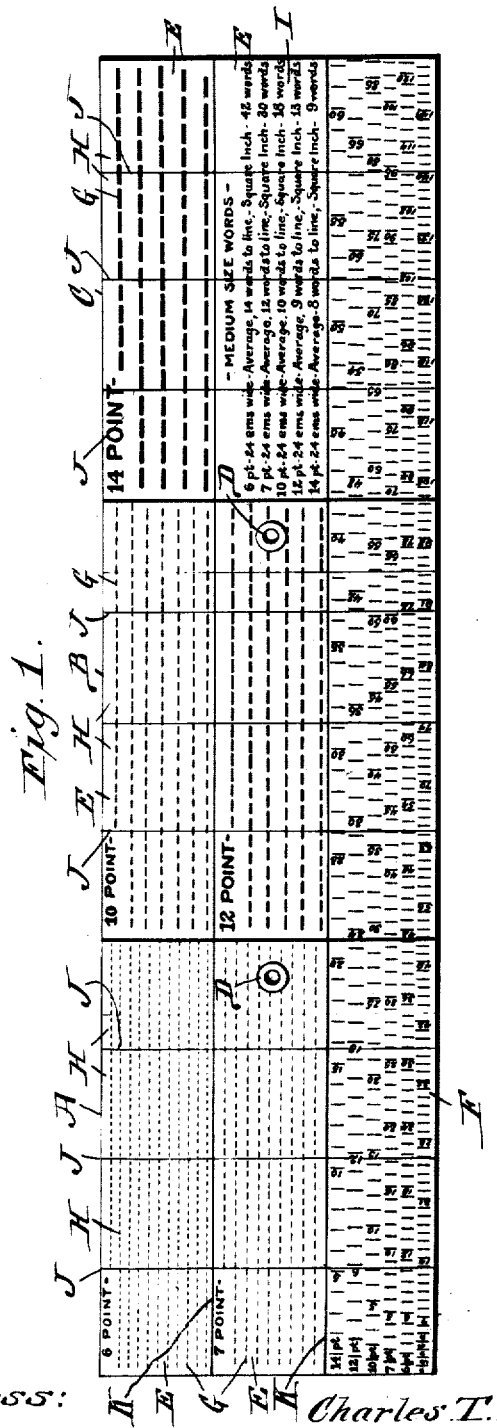
Figure 1 is a plan view of my improved gage in what I now consider its preferred form.
Figure 2:
Fig. 2 is an edge view of the same.

The gage may be of any desired length, for instance, 12 inches, divided into a number of sections suitably connected for folding so that it may be carried in one's pocket and be accessible at all times for use.

In the preferred construction the gage comprises three sections A, B, and C pivotally connected together, as at D, by means of eyelets, or otherwise, so that it may be folded and reduced in length to one-third of its length when opened or extended. The gage is preferably made of transparent material, such as sheet celluloid or the like, cut into the desired lengths and connected together as stated. The section A, which is the uppermost or left hand section, is of shorter length than the remaining sections and, in the drawings, said section A is represented as 4 inches in length and overlapping the adjacent end portion of the adjoining section, the exposed portion of which latter section is also 4 inches in length and overlaps the end section at the right of the gage, said last-mentioned section having its exposed portion represented in the drawings as 4 inches in length.

The face of each section is divided into a number of spaces E, which are preferably rectangular and divided by lines K, each space occupying the full length of the section A, B, or C, as the case may be, and one-third the height of each section; and along the marginal portion of the gage throughout the full length thereof is a scale portion F having graduations which apply to different sizes of type, which range from agate to 14 point size, but which may be enlarged upon to include other sizes if desired, or additional gages may be provided for larger sizes of type. The graduations in the scale portion F are intended to be used for ascertaining the number of lines in any column of printed matter. By printing or otherwise applying these graduations to the face of the transparent gage along the scale portion F, the number of lines in columns of various lengths and in any size of type included within the range on said scale portion can be easily and conveniently measured without resorting to the use of different measuring devices or turning the scale from one edge to another, as is the common practice with scales now in use. In the spaces E, printed matter is represented by dotted lines G, such matter being printed with type of different sizes, the size of type being indicated by the dotted lines with dots of different lengths and thickness. One of the spaces E has, for example, matter printed or otherwise applied thereto in six point type; a second has such matter in seven point type; a third in ten point type; a fourth in twelve point type, and a fifth in fourteen point, but it is apparent that each of these spaces may be utilized for any other desired size than that shown on the drawings. In one of the spaces E, a table I is printed giving the number of medium sized words to a line 24 ems wide when printed in each of the sizes of type shown in the several spaces E and also the number of medium sized words of each size of type that will occupy a square inch.

Each of the spaces E is sub-divided into smaller spaces H by lines J crossing the space E, each of such smaller spaces being preferably a square inch in measurement, which for convenience would be the unit of measurement used, but these sub-divisions so formed may be of smaller or larger square or other areal measurement than a square inch without departing from the principle involved. The lines J are spaced one inch apart and although not so shown in the drawings are by preference, extended through the scale portion F, so that the length of a printed column may be ascertained and also the number of lines in printed columns of any given length, when printed in any of the sizes of type scaled on said scale portion.

In determining the size of type to be used in an allotted space, when setting type from a manuscript, or from a printed form which is to be readjusted to fit the allotted space when of different proportions or shape than the form, it is only necessary to ascertain the number of words used in such manuscript or form, place the gage upon such allotted space, which gives the number of square inches contained in said space, then determine the size of type by the number of words in any of the divisions printed upon the same number of square inches. If, for example it is found that seven point type would not properly fill the allotted space, the division E containing the ten point type will be used to determine whether the allotted space will be fully occupied by printing with ten point type. If the matter to be printed contains words of greater length than the average size, due allowance can be made for the same, and without difficulty the exact size of type required to properly print upon the allotted space in an attractive manner can be readily computed. The writer or compositor will therefore know how effective his matter will look before setting up the type, and considerable time and labor will be saved by reason of the fact that when once set into type, assurance is had that the space will be properly printed without resetting the type in different sizes, as is now often required. Of course due allowance is to be made for display lines, headings, and figures for catalogues or newspaper advertisements.

Arranging printed matter around irregular shaped cuts can be as readily accomplished with this transparent gage as straight printed matter, since by placing any of the spaces E over the irregular space, the exact number of words in each line required to fill such irregular space can be easily determined. In fact, in such cases the sub-divisions of the spaces E may be disregarded, since by knowing the number of words to be printed in a given space the transparency of the gage will enable the user to place the selected size of type set into words on the gage directly over the space to be printed, and such of the words as properly occupy the allotted space can then be counted, thereby enabling the user to determine whether the size of type selected on the gage would be proper to print the known matter in said space or whether a smaller or larger size of type is required. The use of a gage of this kind will cut down the cost of composition work to a considerable degree and eliminates guess work. It further increases speed and avoids re-setting matter on account of being too large or too small for a given space. Furthermore, by printing a gage of this kind on transparent material, it can be used over what is generally termed "the lay-out sheet."

Where in the claims "square measurement" is employed with reference to the space or spaces E on my improved gage, it is not intended to mean that such space or spaces must be square; on the contrary, it is to be understood that the space or each of the spaces may be of any geometrical or other outline and that each space contains a square unit of measurement or a certain number of square units of measurement, and that such units of square measurement may be square inches or larger or smaller than square inches.

Having thus described my invention, what I claim is,—

1. A printer's gage formed of transparent material and adapted to be placed over a space of any size and outline in which a given quantity of matter is to be printed, said gage being divided into spaces whose faces have printed or otherwise applied thereto matter corresponding to different designated sizes of type, each space being subdivided into smaller spaces of any desired unit of areal measurement whereby the proper type can be selected to print a known quantity of matter in any given space to properly occupy said space.

2. A printer's gage of the kind described, having its face divided into spaces and each space having matter printed or otherwise applied thereon with the lines in each space printed with type designated as to size and having the type in each space of different size from that of the other space or spaces, said spaces being subdivided into smaller spaces of given square measurements, the whole serving to enable a printer to select the proper type to print manuscript in any given space.

3. A printer's gage of the kind described, formed of transparent material and having a space thereon occupied with printed matter of a designated size of type, said space being subdivided by divisional lines extending through the printed matter and each of said subdivisions representing a certain square measurement.

4. A printer's gage of the kind described having a plurality of spaces, each space being occupied with continuous printed matter, that of each space being printed from different and designated sized type from that of the other spaces and each space being sub-divided by divisional lines running through said printed matter, the subdivisions formed by said divisional lines being of certain known square measurement and serving as the unit of measurement, and a table thereon indicating the number of words in each of the units of measurement in each of said printed spaces.

In testimony whereof I affix my signature.

CHARLES T. KAMMEYER.